US010518465B2

United States Patent
Derrien et al.

(10) Patent No.: US 10,518,465 B2
(45) Date of Patent: Dec. 31, 2019

(54) MOLD WITH RAISED LAND FOR MANUFACTURING CONTAINERS

(71) Applicant: SIDEL PARTICIPATIONS, Octeville-sur-mer (FR)

(72) Inventors: Mikael Derrien, Octeville-sur-mer (FR); Christophe Bunel, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 223 days.

(21) Appl. No.: 15/519,391

(22) PCT Filed: Oct. 15, 2015

(86) PCT No.: PCT/EP2015/073838
§ 371 (c)(1),
(2) Date: Apr. 14, 2017

(87) PCT Pub. No.: WO2016/059136
PCT Pub. Date: Apr. 21, 2016

(65) Prior Publication Data
US 2017/0232656 A1    Aug. 17, 2017

(30) Foreign Application Priority Data
Oct. 17, 2014    (FR) ...................................... 14 60037

(51) Int. Cl.
*B29C 49/48*    (2006.01)
*B29C 49/12*    (2006.01)
(Continued)

(52) U.S. Cl.
CPC .............. *B29C 49/48* (2013.01); *B29C 49/12* (2013.01); *B29C 49/06* (2013.01);
(Continued)

(58) Field of Classification Search
CPC ......... B29C 49/48; B29C 49/12; B29C 49/06; B29C 49/4823; B29C 2049/4892; B29K 2067/003
See application file for complete search history.

(56) References Cited

U.S. PATENT DOCUMENTS 4,378,328 A * 3/1983 Przytulla ............... B29C 49/482
220/4.05
4,769,206 A    9/1988 Reymann et al.
(Continued)

FOREIGN PATENT DOCUMENTS

EP    2 711 152 A1    3/2014
FR    2 938 464 A1    5/2010
(Continued)

OTHER PUBLICATIONS

International Search Report, dated Jan. 25, 2016, from corresponding PCT application.

*Primary Examiner* — Nahida Sultana

(57) ABSTRACT

Disclosed is a mold for the manufacture, from a blank, of a container having a body and a base provided with a peripheral seat. The mold includes: a wall bearing the impression of the body of the container and provided with an opening; a mold base which is movable relative to the wall between an extended position and a retracted position; the mold base having a peripheral surface which corresponds to a join between the seat and the base of the container and terminates in an edge which is raised with respect to the seat surface. In the extended position of the mold base, the edge extends vertically perpendicular to the opening and, in the retracted position of the mold base, the edge extends near the opening.

20 Claims, 4 Drawing Sheets

(51) Int. Cl.
*B29C 49/06* (2006.01)
*B29K 67/00* (2006.01)
*B29L 31/00* (2006.01)

(52) U.S. Cl.
CPC .. *B29C 49/4823* (2013.01); *B29C 2049/4892* (2013.01); *B29K 2067/003* (2013.01); *B29L 2031/7158* (2013.01)

(56) References Cited

U.S. PATENT DOCUMENTS

| | | | | |
|---|---|---|---|---|
| 5,389,332 A | * | 2/1995 | Amari | B29C 49/6445 |
| | | | | 264/530 |
| 6,536,619 B2 | * | 3/2003 | Gaydosh | B65D 1/0284 |
| | | | | 215/375 |
| 7,134,867 B2 | | 11/2006 | Jarman et al. | |
| 10,150,242 B2 | * | 12/2018 | Ogihara | B29C 49/20 |
| 2005/0170035 A1 | * | 8/2005 | Chen | B29C 49/541 |
| | | | | 425/525 |
| 2006/0170138 A1 | * | 8/2006 | Miller | B29C 49/4823 |
| | | | | 264/523 |
| 2011/0193271 A1 | * | 8/2011 | McCrary | B29C 49/12 |
| | | | | 264/532 |
| 2012/0031916 A1 | | 2/2012 | Derrien et al. | |
| 2014/0145378 A1 | * | 5/2014 | Deau | B29C 49/56 |
| | | | | 264/529 |
| 2014/0203481 A1 | * | 7/2014 | Derrien | B29C 49/12 |
| | | | | 264/532 |
| 2014/0374965 A1 | * | 12/2014 | Tanaka | B29C 49/14 |
| | | | | 264/523 |
| 2016/0288398 A1 | * | 10/2016 | Derrien | B29C 49/48 |
| 2017/0021550 A1 | * | 1/2017 | Derrien | B29C 49/06 |
| 2017/0173845 A1 | * | 6/2017 | Pierre | B29C 49/48 |
| 2017/0305591 A1 | * | 10/2017 | Derrien | B65D 17/02 |

FOREIGN PATENT DOCUMENTS

| | | |
|---|---|---|
| JP | 2001-088202 A | 4/2001 |
| JP | 2008-254244 A | 10/2008 |

\* cited by examiner

MOLD WITH RAISED LAND FOR MANUFACTURING CONTAINERS

BACKGROUND OF THE INVENTION

Field of the Invention

The invention relates to the manufacture of containers, such as bottles or pots, obtained by forming, and more specifically by blow molding or stretch blow molding, starting from blanks made of thermoplastic material.

Description of the Related Art

To manufacture a container according to the blow-molding technique, the first step is to heat a blank (regardless of whether it is a preform or an intermediate container that has undergone a first blow-molding operation starting from a preform) to a temperature that is higher than the glass transition temperature of the constituent material of the blank. The blank is then inserted into a mold, and then the blow molding of the blank is carried out by injecting a gas (such as air) therein under high pressure (in general more than 20 bar).

The stretch-blow-molding technique consists, in addition to the blow molding, in stretching the blank by means of a sliding rod so as to minimize offsetting of the container and to make the distribution of the material as uniform as possible.

A container comprises a side wall (also called a body), a neck that extends from an upper end of the body, and a bottom that extends from a lower end of the body, opposite the neck. The bottom of the container defines a base by which the container can rest on a flat surface (such as a table).

The mold comprises a wall that defines a cavity intended to impart its shape to the body of the container. This cavity is closed, at a lower end, by a mold bottom intended to impart its shape to the bottom of the container.

One of the primary objects targeted today by manufacturers is the decrease in the quantity of material used, which is reflected by a reduction in the weight of the containers, regardless of the destination of the former (still liquids, carbonated liquids, liquids introduced hot into the containers). In return for this lightening of the containers, an attempt is made to increase their rigidity by means of artifacts linked either to the method of manufacturing or to the design, because the structural rigidity associated with just the bi-orientation (axial and radial molecular orientation in relation to the longitudinal central axis of the container) appears inadequate.

It even happens that certain specifications (in particular for hot filling applications or HR—heat resistant-applications) prescribe the reduction in weight and the increase in the structural rigidity of the container at the same time, which increases the design difficulties of the former. In the HR applications, the structural rigidity of the container can be increased thermally by means of a heat-setting (in English, heat set) of the material, consisting in keeping the container in contact with the heated wall of the mold, which increases the crystallinity of the material.

Concerning more particularly the bottom of the container, its structural rigidity can also be increased (or controlled) mechanically by means of a specific local distribution of the material (leading to an additional stretching of the former), by means of a mold provided with a stationary wall bearing the impression of the body of the container, and a mold bottom bearing the impression of the bottom of the container, with this mold bottom being mounted to move in relation to the wall. The container is first blow-molded beyond its final shape, in a lower position of the mold bottom, and then the mold bottom is moved toward an upper position corresponding to the final shape of the container.

This technique, referred to as "boxing," illustrated in the French patent application FR 2 938 464 (SIDEL PARTICIPATIONS) or its U.S. equivalent US 2012/031916, makes it possible to improve the mechanical strength of the bottom of the container, in particular in the area of the base.

In such a mold, a gap is provided between the mold bottom, mounted on a guide jack, and the wall, to maintain between these two parts operational play that has two purposes: on the one hand, to make possible the movement without wedging of the mold bottom in relation to the wall; on the other hand, to form a decompression air vent making it possible to evacuate the air that is trapped between the mold and the container during blow molding.

This technique is satisfactory but can be improved upon.

Actually, the operational play between the mold and the mold bottom cannot be less than the guiding precision of the jack, which is on the order of several tenths of millimeters for travel on the order of 20 to 40 mm.

In other words, this operational play is of the same order of magnitude as the thickness of the material of the final container. The material consequently has a tendency, during blow molding, of flowing into the gap when the mold bottom is in the lower position. The thus pinched material forms, when the mold bottom is moved toward its upper position, a thin bead of material that remains on the final container. This bead, forming a projection on the base of the container, is detrimental to the stability of the former.

The need for stability is particularly critical for certain containers whose bottoms can deform under the effect of significant bending and buckling stresses; cf., for example, the container described in the document EP 2 711 152 (SIDEL PARTICIPATIONS), whose bottom comprises a mechanically reversible membrane for compensating a decrease in volume of the contents accompanying the cooling of the former and putting the container under pressure for increasing its rigidity.

A first solution can consist in trimming the container, by cutting or by abrasion. This solution is not realistic on the industrial scale, however, taking into account production rates (several tens of thousands of containers per hour and per blow-molding machine).

A second solution can consist in adding to the jack a precision guiding device (for example with balls), in such a way as to reduce the operational play between the mold bottom and the wall of the mold. This solution, however, runs up against practical difficulties, because the space requirement of the guiding device would make it necessary to modify by depth the structure of the mold, whereas the space is counted all around the former, taking into account in particular the presence of ducts and connections that are necessary for the circulation of temperature-regulating fluids (heating and/or cooling) in the wall of the mold.

A third solution can consist in anticipating the command for raising the mold bottom, so that the material does not have time to slip back between the wall of the mold and the mold bottom. Under these conditions, however, the material that is intended for the bottom of the container is insufficiently stretched, and the base proves to be poorly formed, which reduces the advantage of the boxing.

In addition, the reduction in the operational play between the mold bottom and the wall of the mold is likely to impede the evacuation of the air that is present in the mold, with a risk of malformation of the container (with an equivalent cycle time) or of a reduction in the cycle time (with an equivalent quality of the container).

BRIEF SUMMARY OF THE INVENTION

A first objective is to propose a technique for manufacturing containers that makes it possible to produce a base that is correctly formed and that has both good rigidity and good stability.

More specifically, a second objective is to propose a technique for manufacturing containers whose bases are without flaws.

For this purpose, in the first place, a mold is proposed for the manufacture, starting from a blank, of a container having a body and a bottom provided with a peripheral base that extends essentially perpendicularly to the body starting from a lower end of the former, with this mold comprising:

a wall having an inner surface that determines at least in part the impression of the body of the container and that delimits a cavity that extends around a central axis, with this inner surface ending, at a lower end, in an opening around the central axis;

a mold bottom that can move in relation to the wall between an extended position, in which the mold bottom is separated from the opening, and a retracted position, in which the mold bottom blocks the opening, with the mold bottom having an upper surface that defines a base surface bearing the impression of the base of the container and that extends vertically perpendicular to the opening.

In this mold:

the upper surface of the mold bottom defines a peripheral surface that corresponds to a join between the base and the body of the container, with this peripheral surface extending in the lengthening of the base surface around the former and ending by a raised edge in relation to the base surface, in the extended position of the mold bottom, the edge extends vertically perpendicular to the opening, in the retracted position of the mold bottom, the edge extends in the vicinity of the opening.

Such a configuration makes it possible to produce a land that, in the area of the cavity, is raised in relation to the base surface of the mold bottom. The container that is blow-molded in such a mold has no axial projection over its base, promoting its stability.

Various additional characteristics can be provided, by themselves or in combination:

in the retracted position of the mold bottom, the edge matches up with the opening;

in the retracted position of the mold bottom, on the inside, the edge is offset from the opening by a radial offset;

the offset is between several tenths of millimeters and several millimeters;

the edge extends an axial distance from an outer perimeter of the base surface of between 0.5 and 5 mm (and preferably between 0.5 and 3 mm), and, for example, on the order of 1 mm;

in addition to the opening, the wall comprises an upper joint face, and in addition to the edge, the upper surface of the mold bottom extends by an inside joint face that extends vertically perpendicular to the upper joint face and that, in the retracted position of the mold bottom, defines a land with the upper joint face;

the upper joint face and the lower joint face form, in the axial cross-section, an angle of between 0 and 120°;

the upper joint face and the lower joint face extend perpendicularly to the central axis;

in the lengthening of the upper joint face, the wall has a bore that extends axially, and in the lengthening of the lower joint face, the mold bottom has a skirt that is housed in the bore in the retracted position of the mold bottom;

the peripheral surface is curved and has a concavity that faces toward the cavity;

the base surface has a slope, whose angle is, for example, between 1° and 15°, and preferably on the order of 8°.

In the second place, a method for manufacturing a container from a blank is proposed, which method comprises operations that consist in:

inserting the blank into a mold as presented above, with the mold bottom being in an extended position, blow-molding the container by injecting a pressurized fluid (in particular a gas) into the blank, during the blow molding, moving the mold bottom toward its retracted position.

BRIEF DESCRIPTION OF THE DRAWINGS

Other objects and advantages of the invention will come to light in the description of an embodiment, provided below with reference to the accompanying drawings in which.

DETAILED DESCRIPTION OF THE PREFERRED EMBODIMENTS

Figure 1:
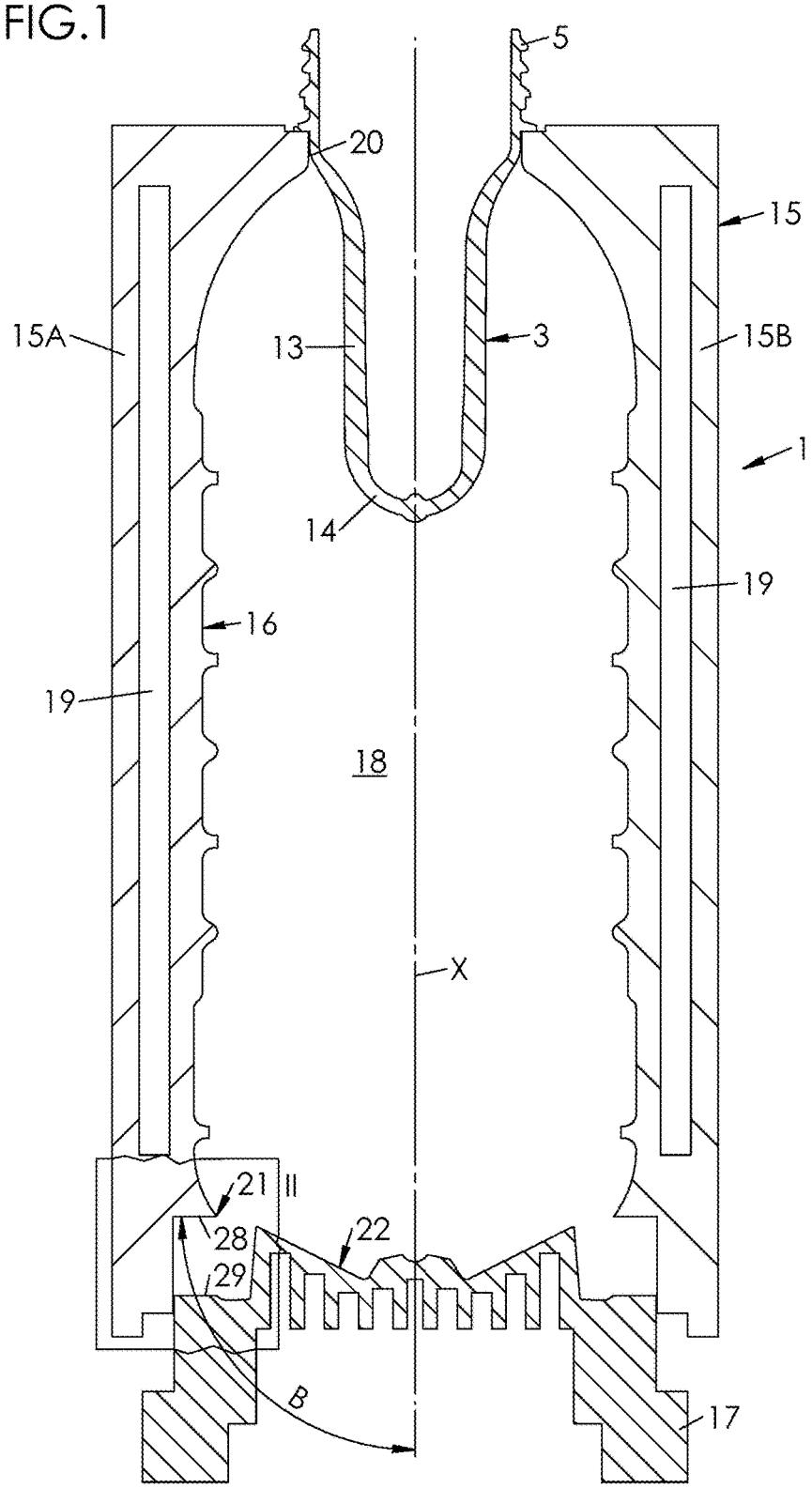
FIG. 1 is a cross-section of a mold that is equipped with a wall and a movable mold bottom, in a lower position corresponding to a forming cycle of a container starting from a blank.
Figure 4:
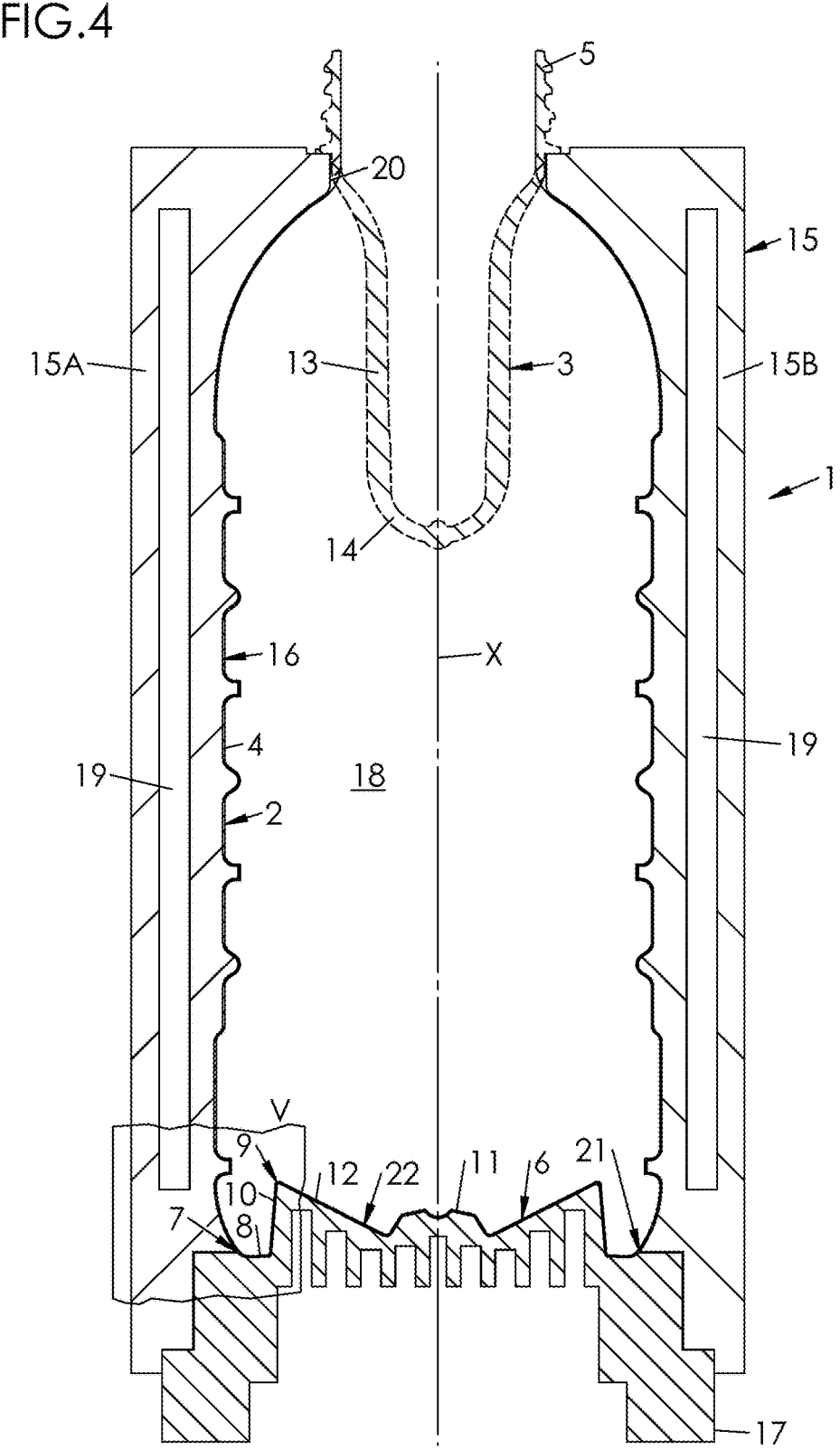
FIG. 4 is a view similar to FIG. 1, showing the mold bottom in the upper position with the container formed starting from the blank (shown in dotted lines)

FIGS. 1 and 4 show a mold 1 for the forming of a container 2 by stretch blow molding starting from a blank 3—in this case, a preform—made of plastic material (such as PET).

The container 2 to be formed has a body 4 that extends along a central axis X, a neck 5 that extends the body 4 at an upper end of the former, and a bottom 6 that closes the body 4 at a lower end 7 of the former, opposite to the neck 5.

The bottom 6 of the container has a peripheral base 8 by which the container 2 is intended to rest on a flat surface such as a table.

The base 8 is not necessarily flat but may have a slope of angle A (most particularly visible in FIG. 3), the advantage of which will become apparent below.

The bottom 6 has a central arch 9 that lengthens the base 8 toward the central axis X of the container 2 and projects toward the inside of the former.

The arch 9 has a tapered side wall 10 here, which projects from an inside edge of the base 8 toward the inside of the container 2, a central piece 11 that also projects toward the inside of the container 2, and a tapered membrane 12 that extends sloped from an upper edge of the wall 10 to a peripheral edge of the central piece 11. With the container 2 having just been formed, the membrane 12 projects toward the outside of the container 2. However, after the container 2 is filled (optionally hot-filled) and stoppered and cooled, the piece 11 is pushed back toward the inside of the former using a pusher (shown, for example, on a jack), causing the membrane 12 to return and keeping the contents of the container 2 under pressure, enhancing the mechanical rigidity of the former. The presence of an initial slope A on the container 2 obtained by forming makes it possible, after the membrane 12 has returned, to absorb a portion of the stresses induced by the pressure of the contents that rest on the arch 9, and then to lock the former, while obtaining a good base surface, enhancing the stability.

Figure 5:
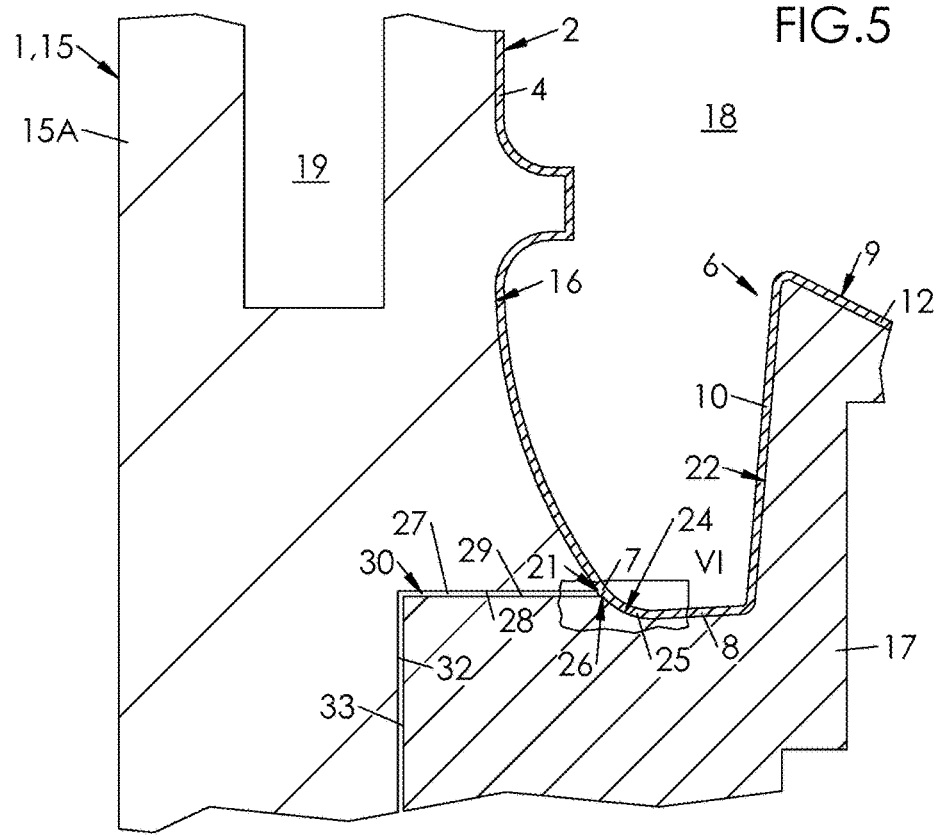
FIG. 5 is a detail view, on an enlarged scale, of the mold of FIG. 4 according to inset V.

According to a particular embodiment illustrated in FIGS. 4 and 5, the body 4 of the container 2 is curved at its lower end 7, in the vicinity of its join with the bottom 6. This shape is illustrative, however, and the body 4 could be straight at its lower end 7.

Each preform 3 comprises an essentially cylindrical barrel 13, designed to form the body 4 of the container 2, a neck 5 that remains unchanged on the container 2, as well as a hemispherical dome 14 that closes the barrel 13 opposite to the neck 5 and is designed to form the bottom 6 of the container 2.

A piece of blow-molding equipment (not shown) that includes in particular a nozzle, pressurized gas sources, and solenoid valves, and, if necessary, a stretching rod that makes it possible to maintain the centering of the preform 3 (and in particular of the dome 14 during the forming of the container 2) are associated with the mold 1.

As can be seen in the figures, the mold 1 comprises a side wall 15, preferably formed by, according to a known principle, two half-molds 15A, 15B, which can be drawn together or separated (for example by rotation around a common hinge) and which have machined surfaces that, when the half-molds 15A, 15B are in contact with one another, jointly form an inner surface 16 that determines the impression of the body 4 of the container 2.

The mold 1 also comprises a mold bottom 17 that determines the impression of the bottom 6 of the container 2. The inner surface 16 delimits a cavity 18 into which the preform 3 is inserted and in which the forming of the container 2 takes place.

As shown in FIGS. 1 and 4, the wall 15, respectively each half-mold 15A, 15B, is traversed by channels 19 for the circulation of fluids that regulate the temperature (heating and/or cooling) of the wall 15. Alternately, instead of channels 19, or in addition to the former, each half-mold 15A, 15B can integrate electrical heating elements, such as resistors.

The inner surface 16 extends around a central axis that is combined with the central axis X of the container 2 that is to be formed. The inner surface 16 ends, at an upper end, in an opening 20 through which the barrel 13 of the preform 3 extends when it is in place in the mold 1, and, at an opposite lower end, in an opening 21 that extends around the central axis X.

The mold bottom 17 is mounted to move axially in relation to the wall 15 between an extended position, in which the mold bottom 17 is separated from the opening 21, and a retracted position, in which the mold bottom 17 blocks the opening 21. The reason why the mold bottom 17 can move is to make it possible, during the forming, to overstretch the bottom 6 of the container 2 in the course of an operation called boxing during which the mold bottom 17, initially in the extended position, is moved toward its retracted position. For this purpose, the mold bottom 17 is, for example, mounted on a pneumatic or hydraulic jack (not shown).

In the configuration illustrated in the figures—provided by way of illustrative example—where the container 2 is oriented with the neck 5 on top, the extended position of the mold bottom 17 corresponds to a lower position, and its retracted position corresponds to an upper position.

The mold bottom 17 has an upper surface 22 that, in the upper position of the mold bottom 17, closes the cavity 18 by blocking the opening 21, thus completing the impression against which is applied the material during the forming of the container 2.

The upper surface 22 defines on its periphery a base surface 23 bearing the impression of the base 8 of the container 2. The base surface 23 extends in a peripheral manner around the central axis X. In the case where the base 8 of the container 2 has a slope, the base surface 23 has, in a corresponding manner, a slope of angle A. The angle A of the slope is, for example, between 1° and 15°. According to a particular embodiment, the angle A of the slope is on the order of 8°.

Figure 2:
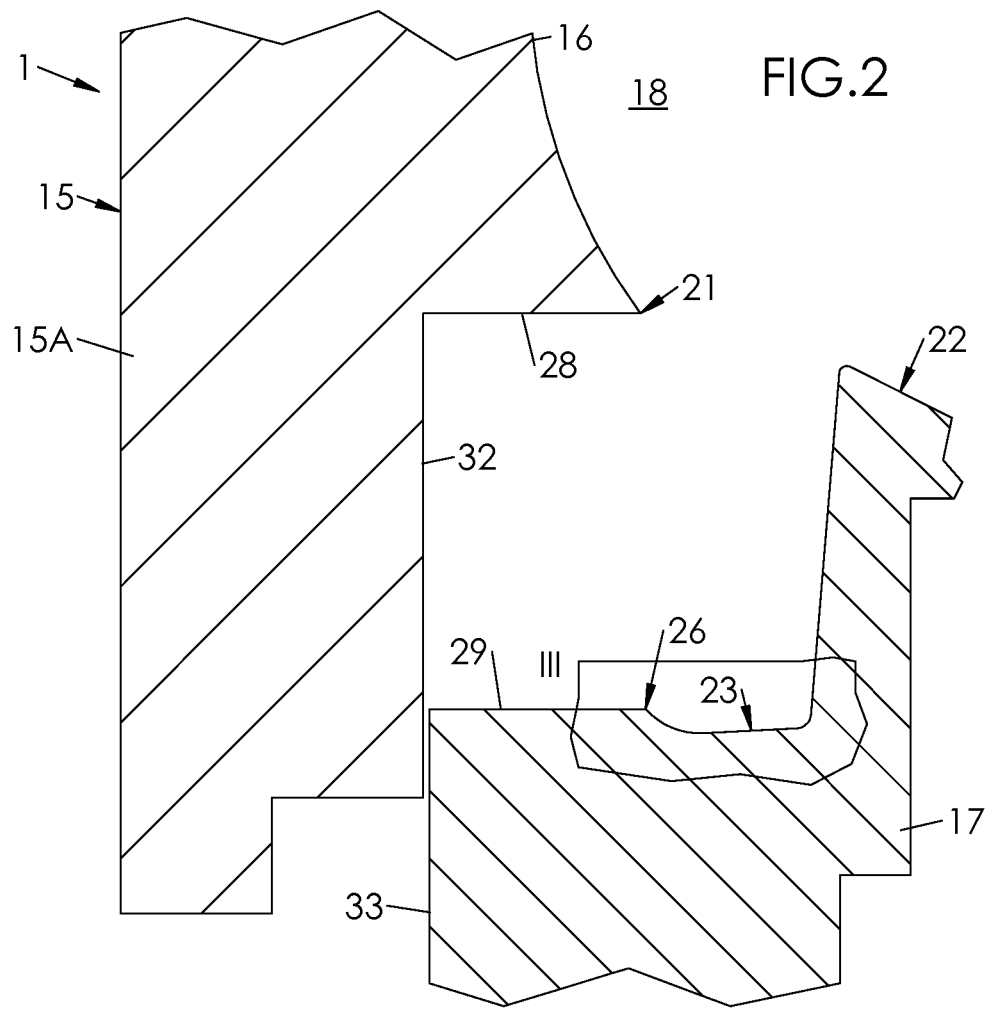
FIG. 2 is a detail view, on an enlarged scale, of the mold of FIG. 1 according to inset II.
Figure 3:
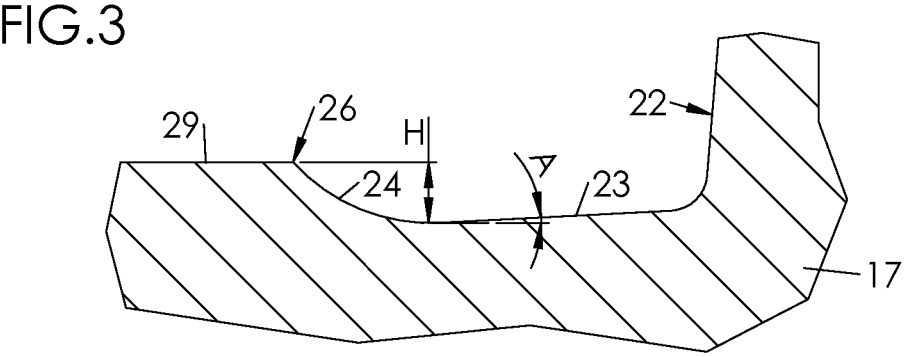
FIG. 3 is a detail view, on an even more enlarged scale, of the mold of FIG. 2 according to inset III.

As FIGS. 2 and 3 clearly show, the upper surface of the mold bottom defines a peripheral surface 24 that extends into the lengthening of the base surface around the former. This peripheral surface 24 corresponds to a join 25 between the body 4 and the base 8 of the container 2. This peripheral surface 24 ends on the outside by a raised edge 26 in relation to the base surface 23, in the direction of the cavity 18. In other words, the peripheral surface 24 forms an excess thickness that projects starting from the base surface 23. The height of this excess thickness, measured axially starting from the outer perimeter of the base surface 23, is denoted H.

In the illustrated example, the join 25 comes in the form of a connecting fillet with an arc cross-section. In this case, the peripheral surface 24 is curved and has a concavity that faces toward the cavity, and its radius is equal to the radius of the connecting fillet forming the join 25.

Figure 6:
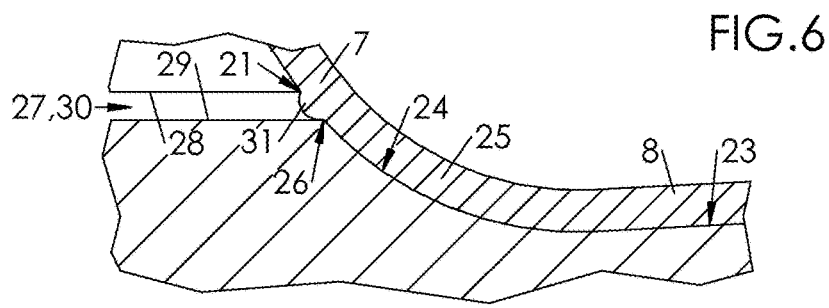
FIG. 6 is a detail view, on an even more enlarged scale, of the mold of FIG. 5 according to inset VI.
Figure 7:
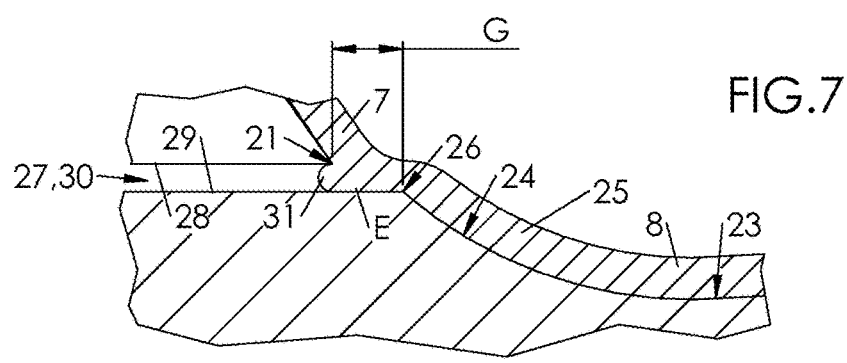
FIG. 7 is a detail view that is similar to FIG. 6, and that illustrates a variant embodiment.

In the extended position of the mold bottom 17, the edge 26 extends vertically perpendicular to the opening 21. In the retracted position of the mold bottom 17, the edge 26 extends in the vicinity of the opening 21. According to an embodiment that is illustrated in FIGS. 5 and 6, the inner diameters that are defined respectively by the edge 26 and the opening 21 are essentially identical, in such a way that in the retracted position of the mold bottom 17, the edge 26 matches up with the opening 21. The term "matches up" does not necessarily imply that the edge 26 and the opening 21 are combined in the retracted position of the mold bottom 17: as we will see below, a gap 27 can be made between them. Be that as it may, when the mold bottom 17 is in its retracted position, the edge 26 extends in the area of the lower end 7 of the body 4. According to a variant embodiment illustrated in FIG. 7, the inner diameter defined by the edge 26 is less than that of the opening 21, at which point, with the mold bottom 17 in the retracted position, the edge 26 is offset on the inside from the opening 21 by a radial offset G. This offset G is between several tenths of millimeters and several millimeters. In the example illustrated, this offset G is less than or equal to 1.5 mm, and, for example, on the order of approximately 1 mm.

According to a particular embodiment, illustrated in the figures, the side wall 15 of the mold 1 comprises, in addition (radially) to the opening 21, an upper joint face 28, and, in a corresponding manner, the upper surface 22 of the bottom extends, in addition to the edge 26, by a lower face 29 that extends vertically perpendicular to the upper joint face 28. As illustrated in FIGS. 5 and 6, when the mold bottom 17 is in the retracted position, the upper joint face 28 and the lower joint face 29 jointly form a peripheral land 30.

The expression "land" refers to a surface join between two complementary parts, which is not necessarily flat but can be of any other shape, in particular tapered.

The angle formed in the axial cross-section by the upper joint face 28 (and by the lower joint face 29) with the central axis X is denoted B. This angle B is between 0° (in which case the land 30 is cylindrical) and 120° (in which case the land 30 is conical), with its tip pointed opposite the cavity 18).

According to a preferred embodiment, however, the angle B is a right angle, i.e., the upper joint face 28 and the lower joint face 29 extend perpendicularly to the central axis X. In other words, the upper joint face 28 and the lower joint face 29, and therefore the land 30, are flat.

As we have seen, in the upper position of the mold bottom 17, a contact is not necessarily made between the upper joint face 28 and the lower joint face 29, in the area of the land 30, because of the gap 27.

This gap 27, which produces play, functions as an air vent, whose purpose is to make possible the evacuation of air trapped between the container 2 and the mold 1 at the end of the forming. This makes it possible to form correctly the base 8, in particular at its join with the lower end 7 of the body 4. Otherwise, a bubble (or bubbles) of air could persist at this join, which would deform the base 8 and, at the very least, could reduce its width at the expense of the stability of the container 2.

The play formed by the gap 27 in the area of the land 30 at the upper position of the mold bottom 17 is preferably on the order of several tenths of millimeters, or limiting the creep of the material at the end of the blow molding, when the mold bottom 17 is in the upper position.

It is nevertheless possible that a flaw 31 may appear on the container 2 during forming, owing to the creeping of a portion of the material into the gap 27 under the high pressure prevailing in the container 2. However, taking into account the axial distance (or height) H that separates, in the area of the inner surface 16 of the mold 1, the land 30 of the outer perimeter from the base surface 23, this flaw 31 extends the same distance H from the outer perimeter from the base 8 by which the container rests on a flat surface. With the base 8 being without flaws (which, if they exist, are located on the body 4), the result is a good stability of the container 2. When an offset G is provided between the edge 26 and the opening 21, an annular shoulder E is created on the container 2 in which, from an aesthetic standpoint, the possible flaw 31 fades away and may appear incidental to the user, while having the advantage, from the standpoint of the expert, of demonstrating a good development of the forming.

The height H is preferably between 0.5 and 5 mm, in particular based on the radius of the connecting fillet forming the join 25 between the body 4 and the base 8. According to a preferred embodiment, the height H is between 0.5 and 5 mm, and, for example, on the order of 1 mm. This value makes it possible to separate the flaw 31 from the base 8 by enough to prevent any stability defect, while preserving the aesthetics of the container 2, with the flaw remaining relatively inconspicuous from the standpoint of a consumer.

According to an embodiment illustrated in the figures, the side wall 15 of the mold 1 has, in the lengthening of the upper joint face 28, a bore 32 that extends axially starting from an outer perimeter of the upper face 28, and, in a corresponding manner, the mold bottom 17 has, in the axial lengthening of the lower joint face 29, a skirt 33 that, in the retracted position of the mold bottom 17, is housed in the bore 32 (cf. in particular FIG. 5).

The skirt 33 has an outside diameter that is smaller than the inside diameter of the bore 32, in such a way that operational play on the order of several tenths of millimeters is provided between the skirt 33 and the bore 32. The result is a channeling of the flow of air evacuated from the cavity 18 in the area of the mold bottom 17, during the blow molding of the container 2.

The mold 1 described above offers the following advantages.

Firstly, as we have seen, the axial separation of the land 30 from the base surface 23 prevents the formation, on the base 8 of the container 2, of an axially projecting flaw that would degrade the stability of the former. And, when a flaw 31 exists, in the form of a collar or a bead formed projecting at the lower end 7 of the body 4, such a radial flaw 31 does not degrade the stability of the container 2.

Secondly, the location of such a flaw 31 in the vicinity of the bottom 6 makes it more or less imperceptible to the end user of the container 2, enhancing the perceived quality of the former.

Thirdly, owing to the offset of the land 30, the presence of a possible flaw 31 no longer depends on the precision of guiding of the mold bottom 17. It is therefore possible to select for the mold bottom 17 a linear actuator (such as a jack) that is relatively imprecise but sturdy, promoting better reliability of the mold 1. The result is also a better evacuation of the air that is present in the cavity 18, owing to the expansion that the air undergoes between the side wall 15 of the mold 1 and the mold bottom 17.

Fourthly, owing also to the offset of the land 30 toward the outside, it is possible to delay the turning-over of the mold bottom 17 without running the risk of damaging the material, enhancing a better impression-taking and a better stretching of the bottom 6 of the container 2.

The manufacture of the container 2 is carried out as follows.

The first step is to insert the preheated preform 3 into the open mold 1. The mold bottom 17 is then in the lower position. The mold 1 is closed again, and a gas (typically air) under a pre-blow-molding pressure (on the order of 5 to 13 bars) is injected into the preform 3. A stretching operation, which consists in stretching the preform 3 by means of a movable rod that will flatten the dome 14 of the preform 3 against the mold bottom 17, can be associated with this injection operation.

When the dome 14 of the preform 3 reaches the mold bottom 17, the former is always in its lower position. The pre-blow-molding pressure is not enough to flatten the material firmly against the side wall 15 of the mold 1; for this purpose, it is necessary to inject a gas (typically air) into the container 2 being formed at a blow-molding pressure that is higher than the pre-blow-molding pressure (in practice, the blow-molding pressure is on the order of 20 to 40 bars).

The raising of the mold bottom 17 is preferably initiated immediately before the blow-molding operation, with this raising imparting to the material of the bottom 6 an additional stretching that is favorable to the orientation of the molecules and the impression-taking of the material on the upper surface 22 of the mold bottom 17.

Although some material flows to the outside of the perimeter of the opening 20, this material remains small in quantity and, in the area of the land 30, with the mold bottom 17 in the upper position, forms a flaw 31 of slight thickness and small radial extension, as illustrated in FIG. 6.

When it is desired to carry out a heat-setting, the blow-molding pressure is temporarily maintained in the thus formed container 2 to keep the former in contact with the heated side wall 15, in such a way as to increase the crystallinity of the material and thus to increase the mechanical strength of the container 2 during its hot-filling (i.e., with a content, liquid or pasty, whose temperature is between approximately 80° C. and 90° C.).

The inside of the container 2 is then placed in the open air, the rod (when it exists) is removed, and the container 2 is evacuated before the cycle is repeated for the next container.

The invention claimed is:

1. A molding assembly for manufacturing a container having a body and a bottom provided with a peripheral base that extends essentially perpendicularly to the body starting from a lower end of the body, the molding assembly starting with a blank to manufacture the container, the molding assembly comprising:
   a wall having an inner surface that determines at least in part the impression of the body of the container and that delimits a cavity that extends around a central axis, with the inner surface ending, at a lower end, in an opening around the central axis;
   a mold bottom configured to move in relation to the wall between an extended position, in which the mold bottom is separated from the opening, and a retracted position, in which the mold bottom blocks the opening, the mold bottom having an upper surface that defines a base surface bearing the impression of the base of the container and that extends vertically perpendicular to the opening,
   wherein the upper surface of the mold bottom defines a peripheral surface that corresponds to a join between the base and the body of the container, the peripheral surface extending into the lengthening of the base surface around the base surface and ending by a raised edge in relation to the base surface,
   in the extended position of the mold bottom, the raised edge extends vertically perpendicular to the opening, and
   in the retracted position of the mold bottom, the raised edge extends in the vicinity of the opening.

2. The molding assembly according to claim 1, wherein, in the retracted position of the mold bottom, the raised edge matches up with the opening.

3. The molding assembly according to claim 1, wherein, in the retracted position of the mold bottom, the raised edge is offset on the inside of the opening by a radial offset.

4. The molding assembly according to claim 3, wherein the offset is between several tenths of millimeters up to one centimeter.

5. The molding assembly according to claim 1, wherein the raised edge extends an axial distance from an outer perimeter of the base surface of between 0.5 and 5 mm.

6. The molding assembly according to claim 5, wherein the axial distance from the edge to the outer perimeter of the base surface is on the order of 1 mm.

7. The molding assembly according to claim 1, wherein:
   the wall further comprises in addition to the opening, an upper joint face, and
   the upper surface of the mold bottom extends, in addition to the raised edge, by a lower joint face that extends vertically perpendicular to the upper joint face and that, in the retracted position of the mold bottom, defines a land with the upper joint face.

8. The molding assembly according to claim 7, wherein the upper joint face and the lower joint face form with the central axis, in axial cross-section, an angle of between 0° and 120°.

9. The molding assembly according to claim 8, wherein the upper joint face and the lower joint face extend perpendicularly to the central axis.

10. The molding assembly according to claim 7, wherein:
    the wall has, in the lengthening of the upper joint face, a bore that extends axially, and
    the mold bottom has, in the lengthening of the lower joint face, a skirt configured to be housed in the bore in the retracted position of the mold bottom.

11. The molding assembly according to claim 1, wherein the peripheral surface is curved and has a concavity that faces toward the cavity.

12. The molding assembly according to claim 1, wherein the base surface has a slope.

13. The molding assembly according to claim 12, wherein the angle of the slope is between 1° and 15°.

14. The molding assembly according to claim 13, wherein the slope has an angle on the order of 8°.

15. A method for manufacturing the container from the blank, the method comprising:
    inserting the blank into the molding assembly according to claim 1, the mold bottom being in the extended position;
    blow molding the container by injecting a pressurized fluid into the blank; and
    during the blow molding, moving the mold bottom toward the retracted position.

16. The molding assembly according to claim 2, wherein the raised edge extends an axial distance from an outer perimeter of the base surface of between 0.5 and 5 mm.

17. The molding assembly according to claim 3, wherein the raised edge extends an axial distance from an outer perimeter of the base surface of between 0.5 and 5 mm.

18. The molding assembly according to claim 4, wherein the raised edge extends an axial distance from an outer perimeter of the base surface of between 0.5 and 5 mm.

19. The molding assembly according to claim 2, wherein:
    the wall further comprises in addition to the opening, an upper joint face, and
    the upper surface of the mold bottom extends, in addition to the raised edge, by a lower joint face that extends vertically perpendicular to the upper joint face and that, in the retracted position of the mold bottom, defines a land with the upper joint face.

20. The molding assembly according to claim 3, wherein:
    the wall further comprises in addition to the opening, an upper joint face, and
    the upper surface of the mold bottom extends, in addition to the raised edge, by a lower joint face that extends vertically perpendicular to the upper joint face and that, in the retracted position of the mold bottom, defines a land with the upper joint face.

* * * * *